US006649054B2

(12) United States Patent
Iida et al.

(10) Patent No.: US 6,649,054 B2
(45) Date of Patent: Nov. 18, 2003

(54) MAGNETIC FILTER DEVICE

(75) Inventors: Sachihiro Iida, Chiyoda-ku (JP); Kenji Nakagawa, Chiyoda-ku (JP); Naoto Ueno, Chiyoda-ku (JP); Katsuhiko Kato, Chiba (JP)

(73) Assignee: Kawasaki Steel Corporation, Kobe (JP)

( * ) Notice: Subject to any disclaimer, the term of this patent is extended or adjusted under 35 U.S.C. 154(b) by 0 days.

(21) Appl. No.: 10/110,309

(22) PCT Filed: Sep. 4, 2001

(86) PCT No.: PCT/JP01/07645

§ 371 (c)(1), (2), (4) Date: May 13, 2002

(87) PCT Pub. No.: WO02/20125

PCT Pub. Date: Mar. 14, 2002

(65) Prior Publication Data

US 2002/0189990 A1 Dec. 19, 2002

(51) Int. Cl.[7] ............................ B01D 35/06; B03C 1/00

(52) U.S. Cl. ....................... 210/223; 210/222; 210/695; 184/6.25

(58) Field of Search ................................ 210/222, 223, 210/695; 184/6.25

(56) References Cited

U.S. PATENT DOCUMENTS 4,594,215 A * 6/1986 Panson et al. .............. 210/223

FOREIGN PATENT DOCUMENTS

| | | |
|---|---|---|
| JP | A 63-23707 | 2/1988 |
| JP | A 7-68109 | 3/1995 |

OTHER PUBLICATIONS

Machine Translation of JP 07–0681089 A which was published on Mar. 1995.*

* cited by examiner

*Primary Examiner*—David A. Reifsnyder
(74) *Attorney, Agent, or Firm*—Oliff & Berridge, PLC

(57) ABSTRACT

In a magnetic filter apparatus in which permanent magnets are arranged to oppose each other with a container therebetween so as to generate a magnetic line of force in a direction substantially orthogonal to the moving direction of the fluid in the interior of the container, while regulating a filter passage time of the fluid in the range of 0.5 to 1.5 seconds, the permanent magnets are arranged so that the distance L (mm) between the permanent magnets in relation to the residual magnetic flux density B (T) of the permanent magnets satisfies the relationship:

$$B\times 100 \leq L \leq B\times 250$$

In this manner, the highest possible performance can be obtained from the filter using general-purpose permanent magnets such as ferrite or neodymium magnets, thereby achieving size reduction of the apparatus at low equipment cost.

1 Claim, 7 Drawing Sheets

PRIOR ART

MAGNETIC FILTER DEVICE

TECHNICAL FIELD

The present invention relates to a magnetic filter apparatus for continuously separating magnetic particles contained in fluids, which is used in cleaning treatment of various types of fluid such as rolling oil for cold-rolling steel sheets and washing liquids for removing the rolling oil after the cold rolling.

BACKGROUND ART

In cleaning rolling oil for cold-rolling of steel sheets and washing liquids for removing the rolling oil remaining on the surface of the cold-rolled steel sheets, a magnetic filter apparatus is used to remove magnetic particles contained in the fluids.

A typical example of a conventional magnetic filter apparatus is now explained with reference to a cross-sectional view in FIG. 1(*a*) and a side view in FIG. 1(*b*). In the drawings, reference numeral 1 denotes a container, 2 denotes a permanent magnet, 3 denotes a filter element, 4 denotes a back plate, 5 denotes a fluid inlet, and 6 denotes a fluid outlet.

A ferromagnetic component comprising a metal grid composed of iron or ferritic stainless steel such as SUS 430 is usually disposed as the magnetic filter element 3 in the interior of the container 1. At the exterior of the container 1, the permanent magnets 2 are arranged to oppose each other with the container 1 therebetween so as to generate a magnetic line of force in a direction substantially orthogonal to the flow direction of the fluid to be treated. The fluid to be treated is fed to the interior of the container 1 from the fluid inlet 5, passes through the magnetic filter element 3, and is discharged from the outlet 6. Magnetic particles such as iron particles contained in the fluid to be treated passing through the magnetic filter element 3 are magnetically attracted to the magnetic filter element 3 magnetized by the permanent magnets 2 and are separated from the fluid to be treated.

In the above-described capturing of the magnetic particles using the magnetic filter apparatus, the attractive force Fm of the filaments or metal grid constituting the filter element is expressed by the formula:

$$Fm = \chi \cdot V \cdot H \cdot (dH/dx),$$

wherein

- $\chi$: magnetic susceptibility of the particles,
- V: volume of the particles,
- H: intensity of the magnetic field, and
- dH/dx: magnetic gradient (spatial variation in the magnetic field.

In the above formula, $\chi$ and V are inherent properties of the magnetic particles. Thus, in order to increase the attractive force Fm and improve the performance of the filter, either the magnetic field H or the magnetic gradient dH/dx must be increased. However, the magnetic gradient dH/dx is a coefficient dependent on the material and the shape of the ferromagnetic component which constitutes the filter element; accordingly, after the material and the shape of the ferromagnetic component are determined, the magnetic gradient dH/dx is regulated by the intensity of the magnetic field. Thus, the foremost requirement for improving the performance of the filter, i.e., the attractive power, is to sustain a strong magnetic field in the interior of the filter.

Hitherto, the relationship between the performance of the filter and the magnetic field has not been fully examined. Accordingly, failures such as degradation of the performance of the filter due to a diminished magnetic field in the filter have occurred frequently. As for the selection of the magnets, it is not clear what degree of strength is required from a magnet in order to achieve the desired filter performance. Moreover, because the relationship between the shape of the filter, the flow speed of the fluid to be treated, and the strength of the magnet is not clear, the filter cannot achieve the desired performance.

In other words, strong magnets do not always yield satisfactory results because of their design and specifications.

Moreover, the use of strong magnets increases the equipment cost, although some improvement can be expected.

DISCLOSURE OF INVENTION

The present invention favorably solves the above-described problems. An object of the present invention is to provide a magnetic filter apparatus of reduced size at low cost by yielding the highest possible performance from the filter in which general-purpose permanent magnets such as ferrite or neodymium magnets are used.

In order to clarify the relationship between the intensity of the magnetic field of the magnetic filter apparatus and the performance of the filter, the present inventors have conducted research on the influence of the various factors on the performance of the filter. During the course, the present inventors have succeeded in clarifying the effect of the various factors on the performance of the filter and developed a low-cost high-efficiency magnetic filter apparatus based on this finding.

That is, the present invention is a magnetic filter apparatus comprising: a container having an inlet and an outlet for fluid; a filter element comprising a ferromagnetic material disposed in the container; and permanent magnets for magnetizing the filter element, the permanent magnets being arranged to oppose each other with the container therebetween so as to generate a magnetic line of force in a direction substantially orthogonal to the moving direction of the fluid inside the container, wherein, while regulating a filter passage time of the fluid in the range of 0.5 to 1.5 seconds, the permanent magnets are arranged so that the distance L (mm) therebetween in relation to the residual magnetic flux density B (T) of the permanent magnets satisfies the relationship:

$$B \times 100 \leqq L \leqq B \times 250$$

In the present invention, the permanent magnets for magnetizing the filter element preferably have a residual magnetic flux density of 0.4 T or more.

BEST MODE FOR CARRYING OUT THE INVENTION

Figure 1A:
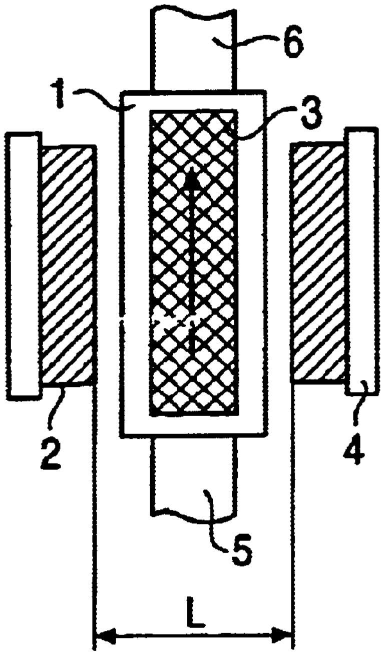
FIG. 1 is a diagram illustrating a typical example of a known magnetic filter apparatus in cross-section in (a) and by side view in (b).

The present invention is described below by way of an embodiment.

First, the course of arriving at the present invention is explained.

The following factors have been considered to affect the performance of a filter:

- the strength of magnets;
- the distance between the magnets;
- the material and the shape of a filter element;
- the flow speed;
- the length of the filter element; and
- the characteristics of the fluid.

In examining these factors related to the performance of the filter, a metal grid of a commonly used ferritic stainless steel SUS 430 (mesh 10, wire: 1.0 mm dia.) was placed in the container as the filter element. An alkaline washing liquid commonly employed for cleaning cold-rolled steel sheets was used as the fluid. The alkaline washing liquid, usually recyclable, had an inlet iron particle concentration of approximately 60 mass ppm to approximately 100 mass ppm before being treated by the filter.

The performance of the filter was evaluated according to the formula:

$$\text{iron particle separation rate } \eta=(F-E)/F\times 100\ (\%)$$

wherein F represents the inlet iron particle concentration and E represents the outlet iron particle concentration.

The performance of the filter is assumed to be satisfactory if the iron particle separation rate η is 60% or more. On the other hand, an iron particle separation rate η of less than 60% is not considered satisfactory since, as described below, the volume of the circulating flow must be increased in order to secure cleanliness of the fluid, thereby requiring large-scale filter equipment.

In the examination of the performance of the filter, the iron particle separation rate η was examined for specimens sampled 10 to 20 minutes after backwashing of the filter when filtering was stably performed.

Commonly-employed ferrite or neodymium magnets having a residual magnetic flux density B of approximately 0.2 T to approximately 0.6 T were used as the permanent magnets.

Figure 1B:
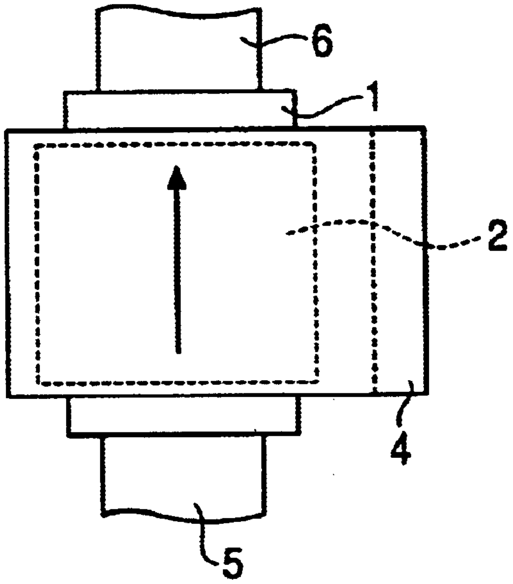
PRIOR ART FIG. 1B

The distance L between the permanent magnets shown in FIG. 1(*a*) is crucial for obtaining the desired performance from the magnetic filter apparatus. In this respect, the iron particle separation rate η was measured while varying the distance L between the magnets from 35 mm to 200 mm.

Figure 2:
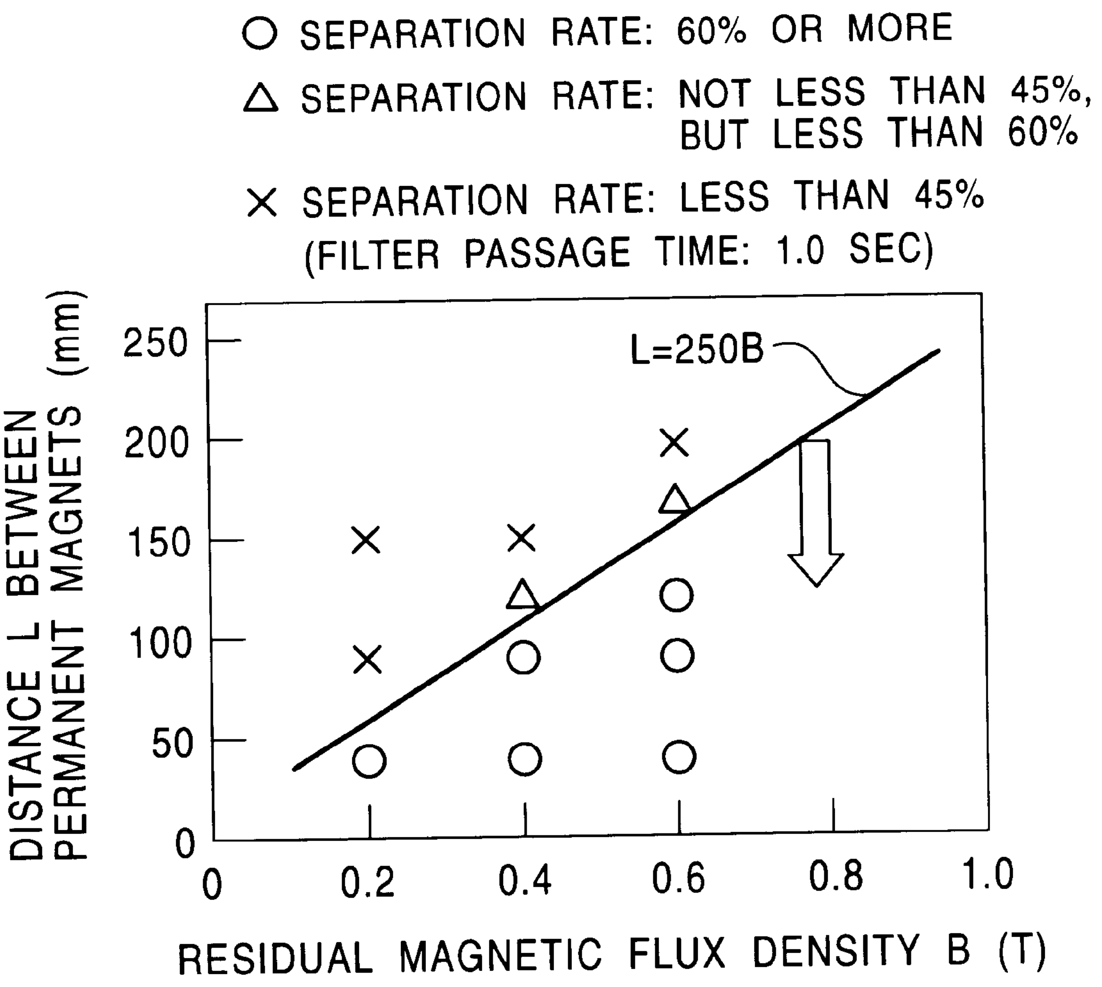
FIG. 2 is a graph showing the effects of the residual magnetic flux density B (T) of the permanent magnets and the distance L (mm) between the permanent magnets on the iron particle separation rate $\eta$.

FIG. 2 shows the experimental results of the effect of the residual magnetic flux density B (T) of the employed permanent magnets and the distance L (mm) between the magnets on the iron particle separation rate η. Note that the time taken for the fluid to pass through the filter was set at 1.0 second.

As is apparent from the graph, the filter stably exhibits excellent performance when the residual magnetic flux density B (T) and the distance L (mm) between the magnets satisfy the formula:

$$L \leq 250\times B$$

Next, the experiment was conducted by reducing the distance L between the magnets. At a distance L of less than B×100, although the iron particle separation rate η is maintained at a high level, the cross-sectional area of the filter reduced remarkably. Accordingly, a large number of filter units are necessary to secure the volume of the circulating flow, which would result in a complicated system, cumbersome maintenance, and significantly high equipment cost.

Figure 3:
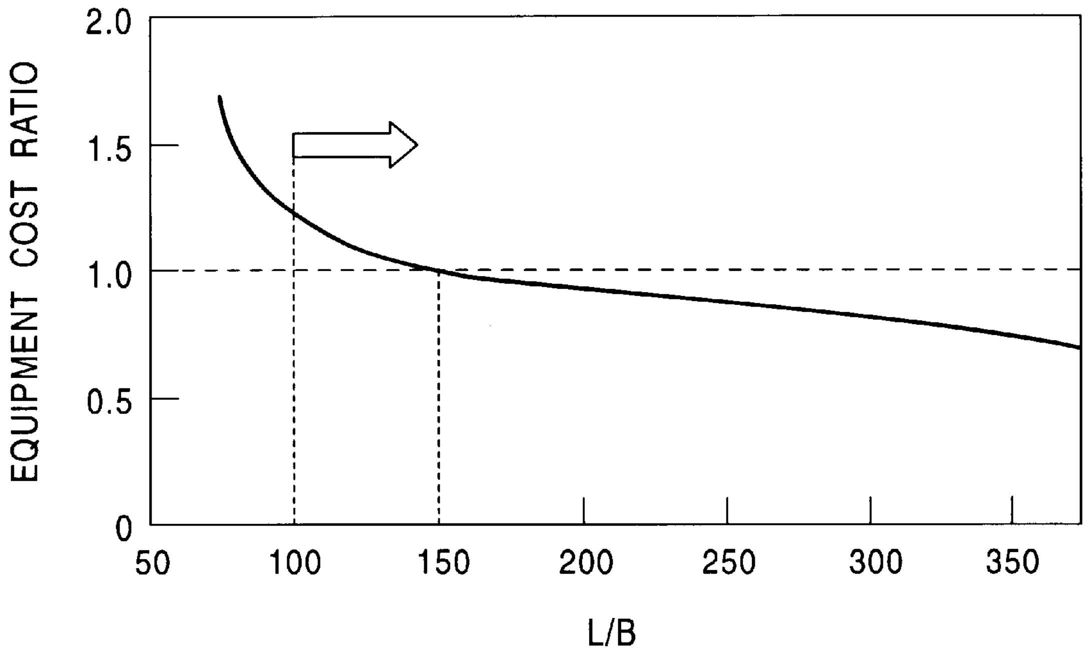
FIG. 3 is a graph showing the relationship between the distance between the magnets, the ratio of the residual magnetic flux densities (L/B), and the equipment cost of the filter.

The equipment cost for the filter was examined by varying L/B using actual equipment for alkali-washing rolled steel sheets. The volume of the washing liquid for the steel sheets was approximately 20 $m^3$ and the circulating flow was 0.2 $m^3$/min. The results are shown in FIG. 3. In the graph, the equipment costs are compared relative to the equipment cost at L/B=150, which is defined as 1.0.

As is apparent from the graph, a decrease in L/B causes an increase in the equipment cost because the number of filters required for securing the volume of the circulating flow must be increased, although the iron particle separation performance of the filter is improved. Especially when L/B is less than 100, the equipment cost drastically increases.

Figure 4:
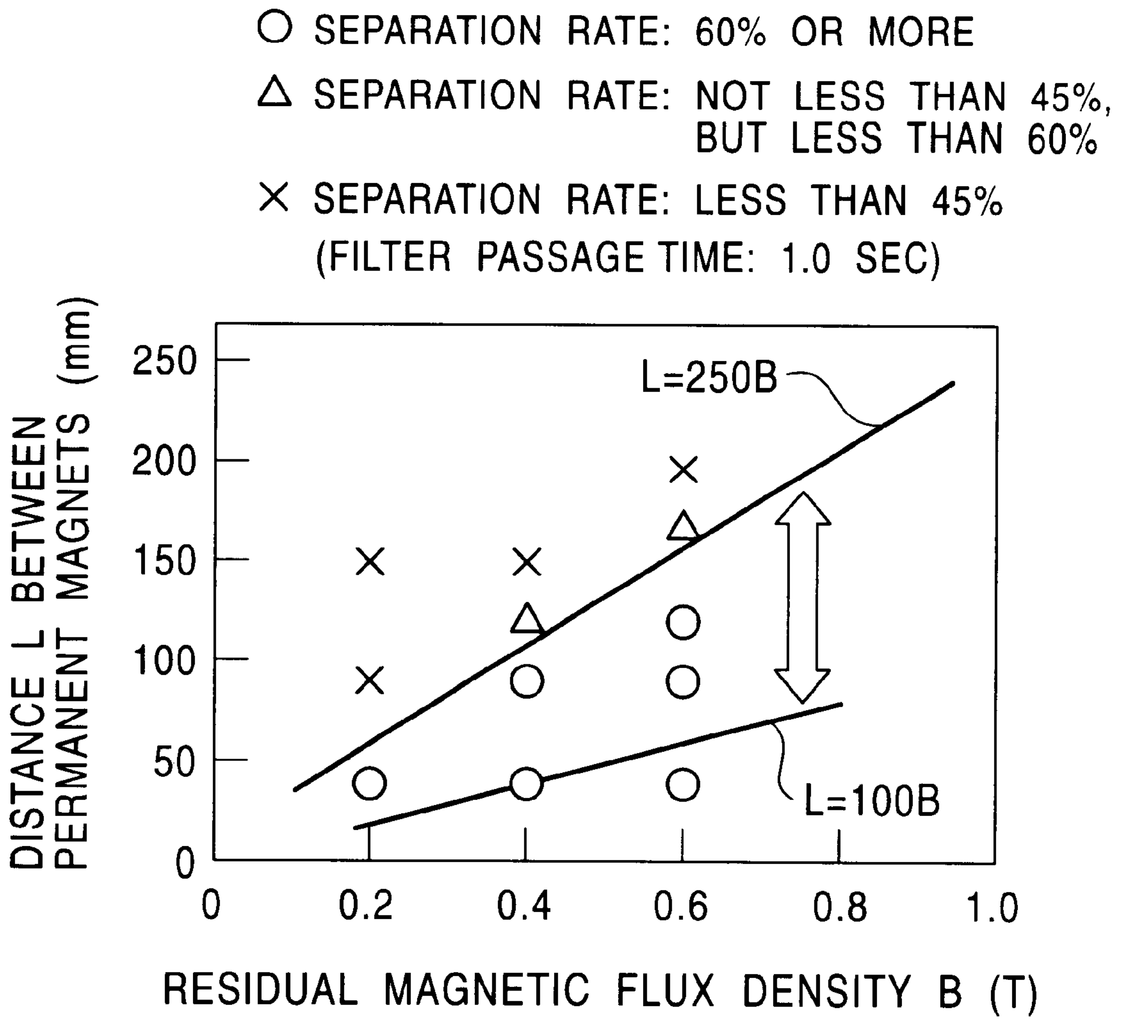
FIG. 4 is a graph showing the relationship between the distance L between the magnets and the residual magnetic flux density B of the permanent magnets capable of yielding a satisfactory iron particle separation rate.

Accordingly, in the present invention, as shown in FIG. 4, the residual magnetic flux density B of the permanent magnets and the distance L between the magnets are set to satisfy the relationship:

$$100\times B \leq L \leq 250\times B$$

Note that in the above-described experiment, the iron particle concentration of the fluid at the inlet of the filter was approximately 60 mass ppm to 100 mass ppm. However, since the filter is constantly recycled, the target cleanliness of the circulating fluid is usually 30 mass ppm or less.

Figure 5:
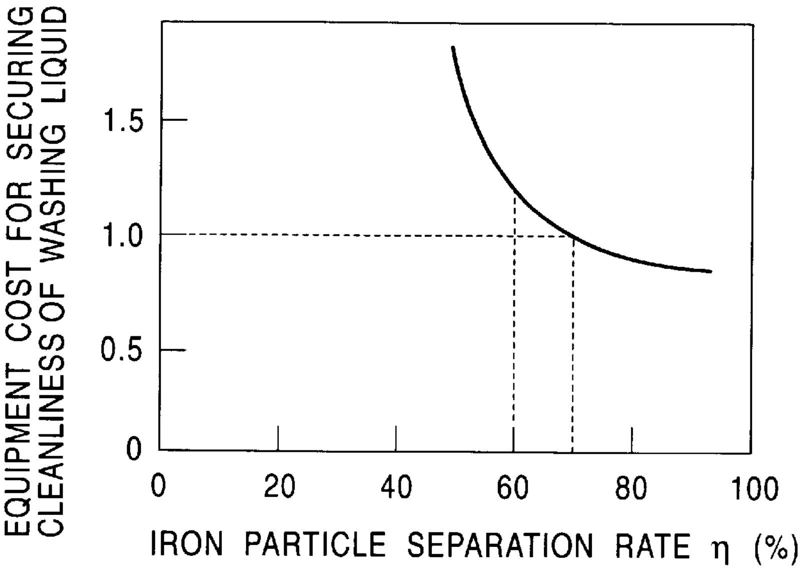
FIG. 5 is a graph showing the relationship between the performance of the filter (the iron particle separation rate η) per unit and the equipment cost of the filter.

The relationship between the performance (iron particle separation rate η) of the filter per unit and the equipment cost for the filter was examined using actual alkali-washing equipment for rolled steel sheets. In the experiment, a filter having a circulating flow volume of 0.2 $m^3$/min was installed onto the path of the alkaline washing liquid to maintain the iron particle concentration in the alkaline washing liquid at approximately 20 ppm. The volume of washing liquid for the steel sheets was approximately 20 $m^3$, and the average iron particle concentration at the inlet of the filter was approximately 150 mass ppm. The results are shown in FIG. 5.

In the graph, the equipment cost is compared relative to the equipment cost required at an iron particle separation rate η of 70%, which is defined as 1.0.

As shown in the graph, at an iron particle separation rate η per unit of less than 60%, a large-scale filter is required to maintain the desired cleanliness of the washing liquid, resulting in high equipment cost. Thus, the iron particle separation rate η of the filter should be 60% or more also from the point of view of equipment cost efficiency.

Figure 6:
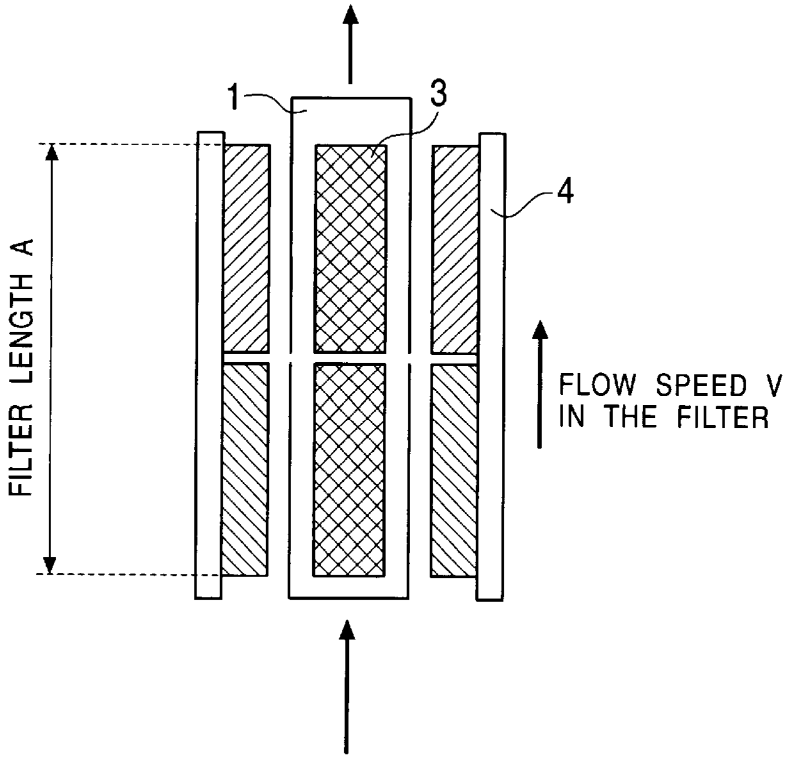
FIG. 6 is a diagram describing a filter length A and a flow speed v in the filter.

Next, the flow volume, the flow speed, and the passage time taken for the fluid to be treated to pass through the filter were examined. The flow speed of the fluid to be treated was varied from 100 mm/sec to 300 mm/sec. The iron particle separation rate η was measured at a filter passage length of 50 mm, 100 mm, 150 mm, and 200 mm. FIG. 6 shows the filter length A and the flow speed v of the fluid in the filter. Herein the filter passage time t is:

$$t=A/v$$

wherein t: the time taken for the fluid to pass through the filter (sec),

A: length of the filter (mm), and v: flow speed of the fluid in the filter (mm/sec).

The above-described experiment demonstrates that the performance of the filter, i.e., the iron particle separation rate η, can be organized in terms of the filter passage time.

Figure 7:
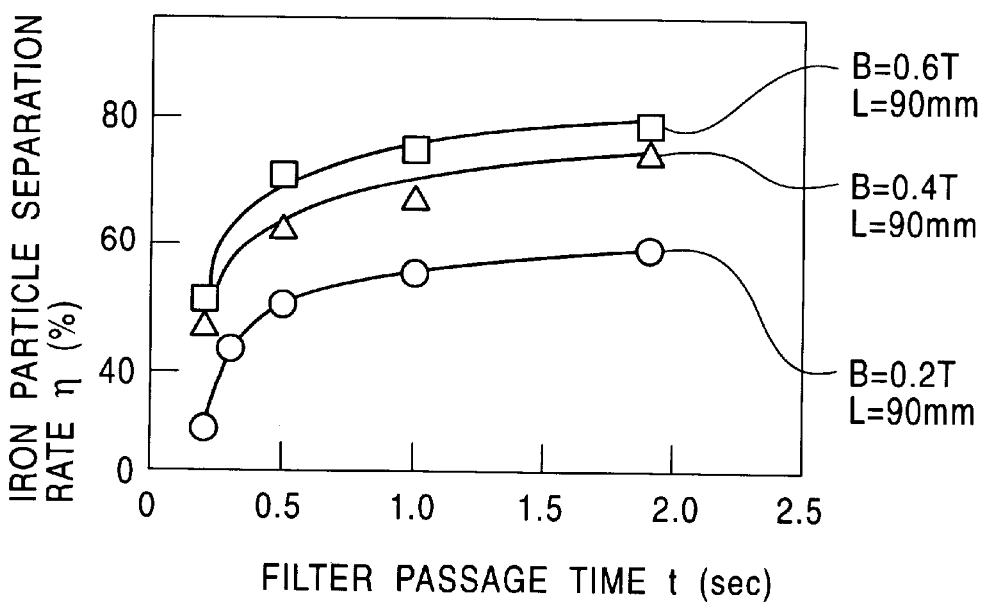
FIG. 7 is a graph showing the relationship between a filter passage time t and the iron particle separation rate η.

In FIG. 7, the results of the examination on the relationship between the filter passage time t and the iron particle separation rate η are organized.

As shown in the graph, in all the samples, the iron particle separation rate η drastically decreased and the performance of the filter was significantly degraded at a filter passage time t of less than 0.5 seconds. Moreover, no significant improvements were observed at a filter passage time t exceeding 1.5 seconds.

Figure 8:
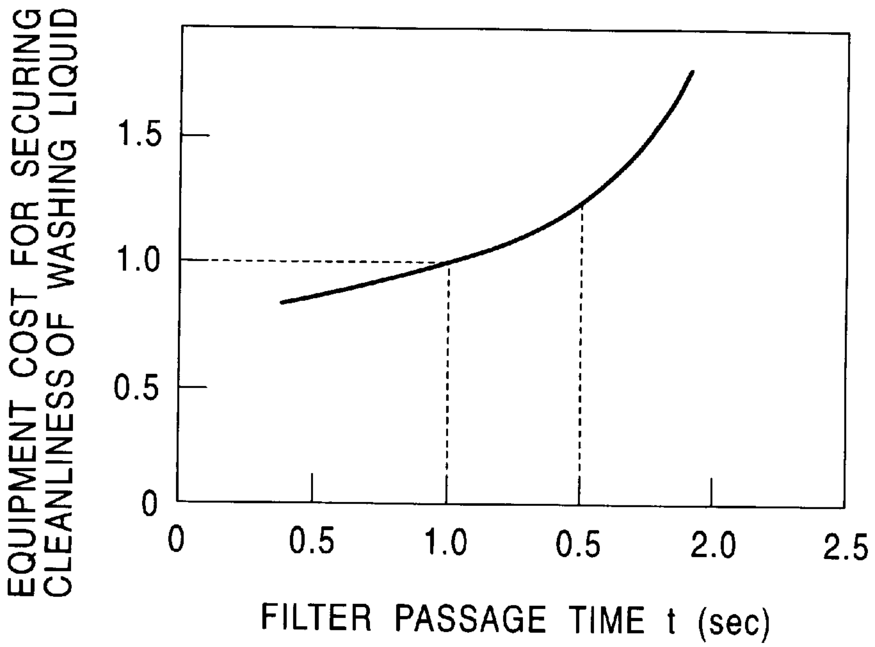
FIG. 8 is a graph showing the relationship between the filter passage time t and the equipment cost of the filter.

Next, the relationship between the filter passage time t and the equipment cost for the filter was examined in actual alkali-washing equipment for rolled steel sheets. In the experiment, the volume of the washing liquid for steel sheets was approximately 20 $m^3$ and the average iron particle concentration at the inlet of the filter was approximately 150 mass ppm in the path for the alkaline washing liquid. The filter was installed onto the path in such a manner that the iron particle separation rate η was 70% at a circulating flow volume of 0.2 $m^3$/min and a passage time of 1.0 second so as to maintain the iron particle concentration in the alkaline washing liquid at approximately 20 mass ppm. The results are shown in FIG. 8. In the graph, the equipment cost is compared relative to the equipment cost at the filter passage time t=1.0 second, which is defined as 1.0.

As shown in the graph, at a filter passage time t exceeding 1.5 seconds, although the necessary iron particle separation rate can be obtained at a small residual magnetic flux density of the permanent magnets and a large distance between the magnets, a large-scale filter is required to maintain the cleanliness of the washing liquid, resulting in increased equipment cost. Thus, the filter passage time t should be 1.5 seconds or less from the point of view of equipment efficiency.

The results shown in FIGS. 7 and 8 demonstrate that the effective filter passage time t is in the range of 0.5 to 1.5 seconds considering the performance of the filter and the equipment cost.

Accordingly, in the present invention, the filter passage time of the fluid is limited to the range of 0.5 to 1.5 seconds.

EXAMPLES

Figure 9:
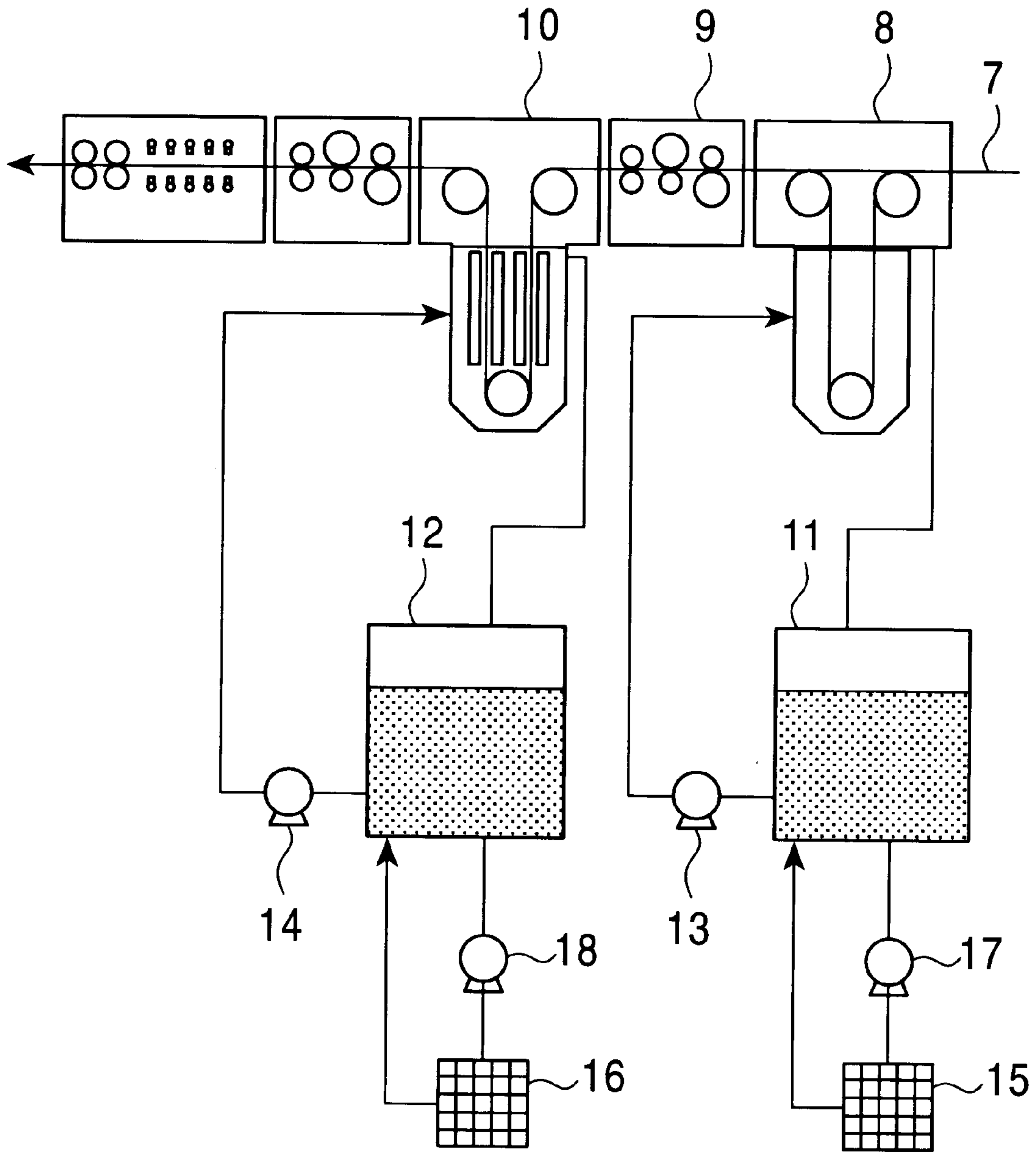
FIG. 9 is a diagram illustrating a cleaning system incorporating a magnetic filter apparatus of the present invention.

Cleaning treatment of the washing liquid was performed using magnetic filter apparatuses of the present invention in actual cleaning equipment shown in FIG. 9.

As shown in the drawing, a steel sheet 7 after rolling was passed through a rough washing tank 8, usually called a dunk-tank, brushed by a first brush scrubber 9, and subjected to main washing in a cleaning tank 10.

The dunk tank 8 and the cleaning tank 10 were provided with circulating tanks 11 and 12, respectively, and a washing liquid mainly constituting an alkaline washing liquid was circulated using pumps 13 and 14.

The washing liquid in the circulating tanks 11 and 12 was fed to magnetic filter apparatuses 15 and 16 using pumps 17 and 18, respectively, to attract and separate the iron particles removed from the steel sheets during cleaning.

The specifications of the magnetic filter apparatus 16 for the circulating tank of the cleaning tank, the filter passage time of the washing liquid, and the iron particle concentration at the inlet are shown in Table 1.

Under the above-described conditions, the iron particle concentration of the washing liquid at the outlet after the cleaning treatment of the washing liquid and the iron particle separation rate η were examined. The results are also shown in Table 1.

As shown in the table, the iron particle separation rate η was 60% or more when the magnetic filter apparatus of the present invention is used in the treatment, achieving satisfactory results.

The examination was also conducted for the cleaning treatment using the magnetic filter apparatus of the present invention as the magnetic filter apparatus 15 for the circulating tank of the dunk tank. The obtained results were satisfactory.

EFFECT OF THE INVENTION

In the cleaning treatment of the fluid using general-purpose permanent magnets, the present invention yields the highest possible performance from the filter, thereby achieving size reduction with low equipment cost.

Conventionally, during continuous annealing after washing, residual iron particles from the surface of steel sheets adhere onto the surface of the rollers in the furnace, thereby frequently generating irregularity defects known as roll marks. This results in degradation in the production yield of approximately 0.2 to 0.5%. However, by using the magnetic filter apparatus of the present invention in the cleaning treatment, the iron particles can be powerfully and stably removed, and such defects can be eliminated thereby.

TABLE 1

| No. | Residual Magnetic Flux Density of Permanent Magnets (T) | Distance between Magnets L (mm) | Filter Length A (mm) | Filter Passage Time t (sec) | Iron Particle Concentration at Fluid Inlet (mass ppm) | Iron Particle Concentration at Fluid Outlet (mass ppm) | Iron Particle Separation Rate η (%) |
|---|---|---|---|---|---|---|---|
| 1 | 0.6 | 150 | 200 | 1.5 | 80 | 20 | 75 |
| 2 | 0.6 | 150 | 100 | 1.0 | 70 | 22 | 69 |
| 3 | 0.6 | 150 | 50 | 0.5 | 76 | 30 | 61 |
| 4 | 0.6 | 90 | 200 | 1.5 | 74 | 11 | 85 |
| 5 | 0.6 | 90 | 100 | 1.0 | 68 | 15 | 78 |

TABLE 1-continued

| No. | Residual Magnetic Flux Density of Permanent Magnets (T) | Distance between Magnets L (mm) | Filter Length A (mm) | Filter Passage Time t (sec) | Iron Particle Concentration at Fluid Inlet (mass ppm) | Iron Particle Concentration at Fluid Outlet (mass ppm) | Iron Particle Separation Rate η (%) |
|---|---|---|---|---|---|---|---|
| 6 | 0.6 | 90 | 50 | 0.5 | 91 | 27 | 70 |
| 7 | 0.4 | 90 | 150 | 1.5 | 95 | 23 | 76 |
| 8 | 0.4 | 90 | 150 | 1.0 | 66 | 20 | 70 |
| 9 | 0.4 | 90 | 150 | 0.5 | 73 | 27 | 63 |
| 10 | 0.4 | 50 | 150 | 1.5 | 87 | 12 | 86 |
| 11 | 0.4 | 50 | 150 | 1.0 | 88 | 16 | 82 |
| 12 | 0.4 | 50 | 150 | 0.5 | 76 | 19 | 75 |

What is claimed is:

1. A magnetic filter apparatus comprising: a container having inlet and outlet for fluid; filter element comprising ferromagnetic material disposed in the container; and permanent magnets for magnetizing the filter element, the permanent magnets being arranged to oppose each other with the container therebetween so as to generate a magnetic line of force in a direction substantially orthogonal to the moving direction of the fluid inside the container, wherein, while regulating filter passage time of the fluid in the range of 0.5 to 1.5 seconds, the permanent magnets are arranged so that the distance L (mm) therebetween in relation to the residual magnetic flux density B (T) of the permanent magnets satisfies the relationship:

$$B\times 100 \leqq L \leqq B\times 250.$$

* * * * *